(12) United States Patent
Takase et al.

(10) Patent No.: US 10,503,169 B2
(45) Date of Patent: Dec. 10, 2019

(54) TRAVEL WORKING MACHINE

(71) Applicant: Kubota Corporation, Osaka-shi (JP)

(72) Inventors: Shunya Takase, Sakai (JP); Tetsuya Nakajima, Sakai (JP); Aya Tanabe, Sakai (JP); Shigeki Hayashi, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/579,292

(22) PCT Filed: May 25, 2016

(86) PCT No.: PCT/JP2016/065399
§ 371 (c)(1),
(2) Date: Dec. 4, 2017

(87) PCT Pub. No.: WO2017/038170
PCT Pub. Date: Mar. 9, 2017

(65) Prior Publication Data
US 2018/0299894 A1    Oct. 18, 2018

(30) Foreign Application Priority Data

Sep. 1, 2015   (JP) ................. 2015-172068

(51) Int. Cl.
*G05D 1/00*     (2006.01)
*G05D 1/02*     (2006.01)
(Continued)

(52) U.S. Cl.
CPC ......... *G05D 1/0088* (2013.01); *A01B 69/008* (2013.01); *A01D 41/127* (2013.01);
(Continued)

(58) Field of Classification Search
CPC .... G05D 1/0088; G05D 1/0278; A01B 69/00; A01D 41/127; B60W 30/18; B60W 40/12; B60W 50/02; B60W 50/038
(Continued)

(56) References Cited

U.S. PATENT DOCUMENTS 5,906,645 A    5/1999  Kagawa et al.
5,984,018 A   11/1999  Yamamoto et al.
(Continued)

FOREIGN PATENT DOCUMENTS

JP    6336170 A   12/1994
JP    9128044 A    5/1997
(Continued)

*Primary Examiner* — Yazan A Soofi
(74) *Attorney, Agent, or Firm* — The Webb Law Firm

(57) ABSTRACT

A travel working machine includes: an automatic travel control unit 61 configured to implement automatic travel based on automatic travel information necessary for automatic travel; a manual travel control unit 52 configured to implement manual travel based on an operation signal from a manual travel operating unit 9; a machine body status detecting unit 51 configured to output machine body status information indicating a machine body status based on the operation signal and a detection signal received from a status detecting device 8; and an automatic travel management section 7 configured to determine forbiddance of automatic travel by the automatic travel control unit 61 and permission of the automatic travel based on the machine body status information, and output a control command in automatic travel forbiddance, for deciding control of the machine body after a command to forbid the automatic travel has been issued, based on the machine body status information.

16 Claims, 6 Drawing Sheets

(51) Int. Cl.
- *A01B 69/00* (2006.01)
- *A01D 41/127* (2006.01)
- *B60W 30/18* (2012.01)
- *B60W 50/12* (2012.01)
- *B60W 50/038* (2012.01)
- *B60W 50/10* (2012.01)
- *B60K 28/10* (2006.01)
- *A01B 69/04* (2006.01)
- *B60W 50/029* (2012.01)
- *B60W 50/00* (2006.01)

(52) U.S. Cl.
CPC .......... *A01D 41/1278* (2013.01); *B60K 28/10* (2013.01); *B60W 50/10* (2013.01); *G05D 1/0061* (2013.01); *G05D 1/0278* (2013.01); *B60W 2050/0006* (2013.01); *B60W 2050/0295* (2013.01); *B60W 2300/158* (2013.01); *B60Y 2200/222* (2013.01); *G05D 2201/0201* (2013.01)

(58) Field of Classification Search
USPC .......................................................... 701/23
See application file for complete search history.

(56) References Cited

U.S. PATENT DOCUMENTS

| | | | | |
|---|---|---|---|---|
| 6,633,800 | B1* | 10/2003 | Ward | B60W 50/02 180/167 |
| 9,342,074 | B2* | 5/2016 | Dolgov | B60W 30/00 |
| 9,465,388 | B1* | 10/2016 | Fairfield | G05D 1/0044 |
| 2006/0195238 | A1 | 8/2006 | Gibson et al. | |
| 2007/0293989 | A1 | 12/2007 | Norris | |
| 2009/0248231 | A1* | 10/2009 | Kamiya | G05D 1/0061 701/23 |
| 2010/0250023 | A1* | 9/2010 | Gudat | E02F 9/2045 701/2 |
| 2015/0134178 | A1 | 5/2015 | Minoiu-Enache | |
| 2018/0215393 | A1* | 8/2018 | Miyakubo | G05D 1/0278 |

FOREIGN PATENT DOCUMENTS

| | | |
|---|---|---|
| JP | 9222922 A | 8/1997 |
| JP | 10147952 A | 6/1998 |
| JP | 2002175597 A | 6/2002 |
| JP | 2008250995 A | 10/2008 |
| JP | 201223997 A | 2/2012 |
| JP | 2014180894 A | 9/2014 |
| JP | 201544432 A | 3/2015 |
| WO | 2013033179 A1 | 3/2013 |

\* cited by examiner

TRAVEL WORKING MACHINE

CROSS-REFERENCE TO RELATED APPLICATIONS

This application is the United States national phase of International Application No. PCT/JP2016/065399 filed May 25, 2016, and claims priority to Japanese Patent Application No. 2015-172068 filed Sep. 1, 2015, the disclosures of which are hereby incorporated in their entirety by reference.

TECHNICAL FIELD

The present invention relates to a travel working machine including: an automatic travel control unit configured to implement automatic travel based on automatic travel information necessary for automatic travel; and a manual travel control unit configured to implement manual travel based on an operation signal from a manual travel operating unit.

BACKGROUND ART

Travel working machines such as combines and tractors with a function of automatically traveling without being operated by a driver have been proposed. For example, Patent Literature 1 discloses a travel working machine including a mode switching means for switching modes between an automatic travel mode that allows the machine body to automatically travel along a target travel route set in advance, a manual travel mode that allows the machine body to travel in response to manual operation, an automatic travel preparation mode, and a manual travel preparation mode. The automatic travel preparation mode is a mode of transition from the manual travel mode to the automatic travel mode, and, in this mode, the engine changes to idling speed and enters a travel stoppage state, and the machine body waits until an automatic travel start instruction is issued. When data necessary for automatic travel in the automatic travel preparation mode is obtained and an automatic travel start instruction is issued, the mode changes to the automatic travel mode. Furthermore, in the automatic travel preparation mode, if automatic travel suspension conditions are satisfied or a predetermined period of time has elapsed after the transition, the mode changes to the manual travel preparation mode. The manual travel preparation mode is a mode of transition from the automatic travel mode to the manual travel mode, and, in this mode, the engine changes to idling speed and enters a travel stoppage state.

PRIOR ART DOCUMENT(S)

Patent Literature(s)

Patent Literature 1: JP 2014-180894A

SUMMARY OF THE INVENTION

Problem to be Solved by the Invention

According to the travel working machine of Patent Literature 1, the manual travel preparation mode is set to be between the two modes when changing from automatic travel to manual travel, and the machine body stops. For example, if temporary manual travel using a manual travel operating unit such as a steering wheel or a manipulation lever is performed in order to eliminate a positional deviation or avoid obstacles during the automatic travel, the machine body temporarily stops. The stoppage of the machine body when changing from automatic travel to manual travel is a commonly required function. However, if the machine body stops every time the speed is changed or the steering angle is modified even slightly, the stoppage may be unsuitable or unnecessary depending on the machine body status. Furthermore, when changing from automatic travel to manual travel, it may be suitable to stop not only the machine body but also the engine.

In view of the above-described circumstances, there is demand for a travel working machine in which control of a machine body performed when changing from automatic travel to manual travel is suitably performed according to the machine body status.

Solution to the Problem

The present invention provides as under:
A travel working machine comprising:
an automatic travel control unit configured to implement automatic travel based on automatic travel information necessary for automatic travel;
a manual travel control unit configured to implement manual travel based on an operation signal from a manual travel operating unit;
a machine body status detecting unit configured to output machine body status information indicating a machine body status based on the operation signal and a detection signal received from a status detecting device; and
an automatic travel management section configured to determine forbiddance of automatic travel by the automatic travel control unit and permission of the automatic travel based on the machine body status information, and output a control command in automatic travel forbiddance, for deciding control of the machine body after a command to forbid the automatic travel has been issued, based on the machine body status information.

With this configuration, the machine body status detecting unit detects a manual operation performed on the manual travel operating unit from an operation signal, and, further detects the behavior of a vehicle-mounted device from a detection signal of the status detecting device, thereby detecting various statuses of the machine body. The machine body status information resulting from the detection includes a difference between a target value and an actual measurement value in automatic travel, the current status of the machine body, a manual operation made by an operator, the content of the behavior of a vehicle-mounted device during manual operation and the like. If it is determined that automatic travel forbiddance, that is, a command to change automatic travel to manual travel is given, a control command in automatic travel forbiddance is outputted to the corresponding operation device based on the machine body status information, and control of the machine body that is to be performed next reflects the machine body status. The control commands in automatic travel forbiddance include, for example, "stop the engine", "stop the machine body", "continue travel of the machine body", "return to automatic travel after temporary manual travel" and the like.

In automatic travel control, the amount of control data that is transmitted via a vehicle-mounted network is larger than that of manual travel control. Furthermore, there are pieces of control data that are used only in manual travel control and control data that is used only in automatic travel control. Accordingly, in a preferred embodiment of the present invention, the manual travel control unit and the machine body status detecting unit are connected to a first vehicle-mounted network, the automatic travel control unit is connected to a second vehicle-mounted network, the travel working machine further includes a relay unit configured to function as a bridge between the first vehicle-mounted network and the second vehicle-mounted network, and the relay unit has a filtering function of selecting data that is to be transmitted between the first vehicle-mounted network and the second vehicle-mounted network. Accordingly, situations in which control data that is used only in manual travel control flows through the second vehicle-mounted network and is wasted and control data that is used only in automatic travel control flows through the first vehicle-mounted network and is wasted can be suppressed. That is to say, since the role of the vehicle-mounted networks is divided into the first vehicle-mounted network and the second vehicle-mounted network, the load on each vehicle-mounted network can be reduced. Moreover, since automatic travel working machines that can perform completely autonomous travel are still under development and there are many cases in which an automatic travel control unit is incorporated in a travel working machine in which manual travel by a manual travel control unit is already constructed, it is advantageous to additionally connect the second vehicle-mounted network to the first vehicle-mounted network.

An own vehicle position detecting module for acquiring own vehicle position information is an essential constituent element for automatic travel control, wherein the own vehicle position is updated at short time intervals, and own vehicle position information is outputted at each update, and thus the amount of data that is transmitted from the own vehicle position detecting module to the functional sections of the automatic travel control system is large. Accordingly, it is preferable that an own vehicle position detecting module for acquiring own vehicle position information is connected to the second vehicle-mounted network in which mainly functional sections of the automatic travel control system are constructed.

When automatic travel is forbidden (stopped), it is advantageous to promptly change the travel to manual travel because the traveling state can be maintained without stopping the machine body, and the work is not stopped. Conversely, when automatic travel is forbidden (stopped) to avoid an emergency, it is preferable to stop the machine body without changing the travel to manual travel. In a greater emergency, it is necessary not only to stop the machine body but also to stop the engine. That is to say, desirable control of the machine body when automatic travel is forbidden (stopped) depends on the situation (status) of the machine body. Accordingly, it is preferable that the machine body status information used for deciding control of the machine body after a command to forbid the automatic travel has been issued contains information indicating the current status of the machine body. Furthermore, since the machine body is driven through control operations of various operation devices, it is desirable to forbid automatic travel when a difference in the control (a difference between a target value and an actual value) increases. Accordingly, in a preferred embodiment of the present invention, the machine body status information used for deciding control of the machine body after a command to forbid the automatic travel has been issued contains information indicating a difference between a target value and an actual value.

In particular, when an anomaly in the automatic travel control unit is detected, the automatic travel is highly likely to fail, and thus it is preferable to forbid automatic travel.

Not only the machine body status information but also various types of data is inputted to the automatic travel management section configured to decide automatic travel forbiddance and control of the machine body according to the automatic travel forbiddance. Furthermore, the automatic travel management section is configured to also manage change from automatic travel to manual travel and change from manual travel to automatic travel, and thus a large amount of data is also exchanged between the automatic travel control unit and the manual control unit. In order to efficiently perform such data exchange, in a preferred embodiment of the present invention, the automatic travel management section includes a first automatic travel management section that is linked to the manual travel control unit in the first vehicle-mounted network, and a second automatic travel management section that is linked to the automatic travel control unit in the second vehicle-mounted network, and the machine body status information is transmitted from the machine body status detecting unit via the relay unit to the second automatic travel management section. With this configuration, data exchange between the automatic travel management section and the automatic travel control unit and data exchange between the automatic travel management section and the manual travel control unit are more efficient.

It is also required that the content of the machine body status information used when the automatic travel management section decides automatic travel forbiddance and control of the machine body according to the automatic travel forbiddance can be selected. For example, even in a case where a control rule is set that forbids automatic travel when a speed change lever is operated during automatic travel, such a control rule may be unnecessary for some users. That is to say, it is required to exclude a detection signal generated when an operation on a speed change lever is detected, from determination conditions for forbidding automatic travel. In consideration of such circumstances, according to an embodiment of the present invention, the detection signal used for outputting the machine body status information can be selected.

EMBODIMENTS OF THE INVENTION

Figure 1:
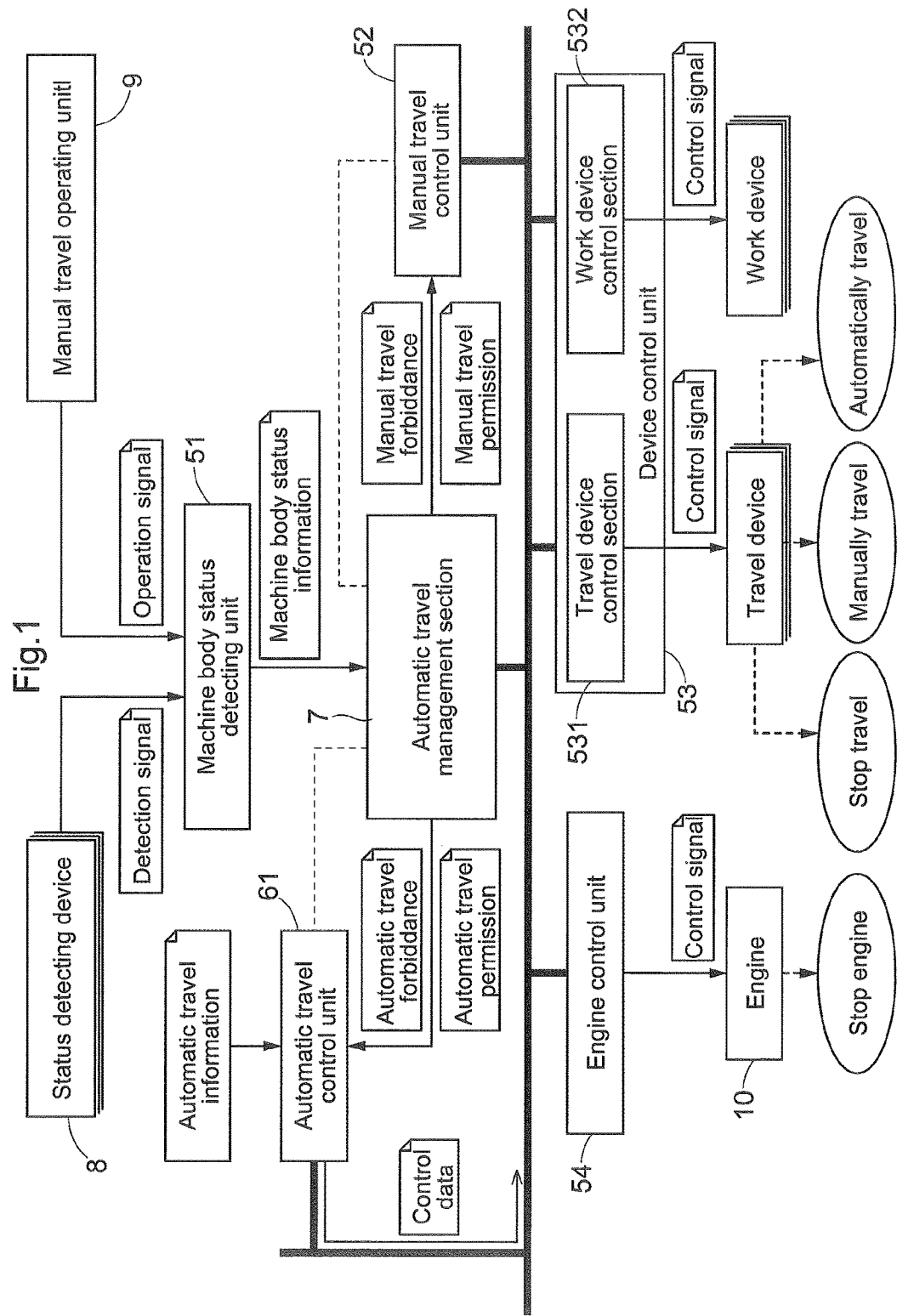
FIG. 1 is an explanatory view illustrating a basic principle of automatic travel control and manual travel control in a travel working machine according to the present invention.

Before illustrating specific embodiments of a travel working machine according to the present invention, a basic principle of automatic travel control and manual travel control, in particular, a basic principle in shift control from automatic travel to manual travel will be described with reference to FIG. 1. The travel working machine includes a manual travel control unit 52 configured to implement manual travel of the machine body based on an operation signal outputted when an operator operates a manual travel operating unit 9 including a manipulation lever and the like; and an automatic travel control unit 61 configured to implement automatic travel based on automatic travel information. The automatic travel information contains an own vehicle position, a target route, and content of an operation of travel devices and work devices that needs to be performed during automatic travel, for example. The own vehicle position is calculated based on satellite navigation using a GPS (Global Positioning System, a GNSS (Global Navigation Satellite System) or the like, or inertial navigation using an IMU (inertial measurement unit) sensor or the like. In order to implement automatic travel based on the automatic travel information, the automatic travel control unit 61 gives control data to a device control unit 53 configured to output a control signal to the travel devices and the work devices. The control data contains travel device control information such as information related to steering control or vehicle speed control performed to align the own vehicle position to a target travel route set in advance; and work device control information that is information related to work control for the work devices configured to perform work that has to be performed during travel along the target travel route. The device control unit 53 uses the control data to generate a control signal that is to be outputted to the travel devices and the work devices. The engine is controlled using a control signal from an engine control unit 54.

The travel working machine includes a machine body status detecting unit 51 configured to detect various statuses of the working machine, and to output machine body status information indicating a machine body status. The machine body status detecting unit 51A receives inputs including: detection signal from a status detecting device 8 configured to detect the behavior of the travel devices and the work devices; and an operation signal of the manual travel operating unit 9. The status detecting device 8 includes, for example, various sensors and switches such as a sensor for detecting engagement and disengagement of a clutch of various work devices, a vehicle speed sensor, a sensor for detecting a fuel level in a fuel tank and an emergency stop switch; and further includes a sensor for detecting a grain amount contained in a grain tank in case the travel working machine is a combine. The status detecting device 8 may further include an own vehicle position detecting module for detecting an own vehicle position using satellite navigation or the like, a control anomaly checking module for checking for anomaly detection in an electronic control unit, that is referred to as an ECU and the like. Accordingly, the machine body status detecting unit 51 can detect deviation between the own vehicle position and the target travel route during automatic travel, and an anomaly in the electronic control unit. Furthermore, the manual travel operating unit 9 includes manipulation tools and speed change tools, and operation signals of these tools are outputted from the manual travel operating unit 9. Thus, it is possible to infer, from the machine body status information, the intention of an operator who is riding on the travel working machine or at the working site, a problem in the machine body, a change request from working travel to non-working travel or from non-working travel to working travel and the like.

Forbiddance of automatic travel by the automatic travel control unit 61 and permission of automatic travel by the automatic travel control unit 61 are determined by an automatic travel management section 7 based on the machine body status information from the machine body status detecting unit 51. If it is decided to forbid automatic travel based on the machine body status information, the automatic travel management section 7 outputs a control command during automatic travel forbiddance, in order to selectively perform various types of control of the machine body according to the automatic travel forbiddance.

It is decided to forbid automatic travel when a machine body status as follow occurs, for example:

(1) an emergency stop switch is turned on;

(2) a manipulation lever for manipulating the machine body is manually operated;

(3) a speed change lever is kept at the neutral position for a time longer than a predetermined period of time;

(4) the engine stops due to an engine stall or the engine is manually turned off;

(5) the travel working machine is a combine, and it is determined that the grain tank is full;

(6) a switch for implementing automatic travel is turned off;

(7) deviation of the own vehicle position from the target travel route by a predetermined value or more continues for a predetermined period of time;

(8) mismatch between a control target and an actual measurement of the travel devices and the work devices continues for a predetermined period of time;

(9) an anomaly in various control units mainly constituted by a CPU (central processing unit) is detected (e.g. the automatic travel control unit 61, the manual travel control unit 52, etc.);

(10) travel along a set target travel route is completed;

(11) a unit of work travel (e.g., working travel route corresponding to one line) is ended in a state where the fuel level is close to zero; and

(12) a unit of work travel is ended in a state where the grain tank is at a full level (¾ or more).

As a control command in automatic travel forbiddance that is outputted when it is decided to forbid automatic travel, "stop the engine (engine stop command)" and "stop the machine body (travel stop command)"; and assuming that the machine body continues to travel, "change to manual travel through manual travel control (automatic-manual change command)", "return to automatic travel after temporary manual travel (automatic-manual-automatic change command)" and the like are proposed. The content of the control command in automatic travel forbiddance depends on the machine body status based on which it was decided to forbid automatic travel. For example, "stop the engine" can be associated with the machine body statuses (1) and (7) described above. "Stop the machine body" can be associated with the machine body statuses (5), (6) and (8) to (10) described above, for example. "Change to manual travel through manual travel control" can be associated with the machine body statuses (2) and (3), for example. It will be appreciated that the association between the content of a control command in automatic travel forbiddance and a machine body status based on which it was decided to forbid automatic travel is not limited to those described above. Furthermore, it is also possible to adopt a configuration in which a selected specific machine body status is excluded from factors for deciding to forbid automatic travel.

Figure 2:
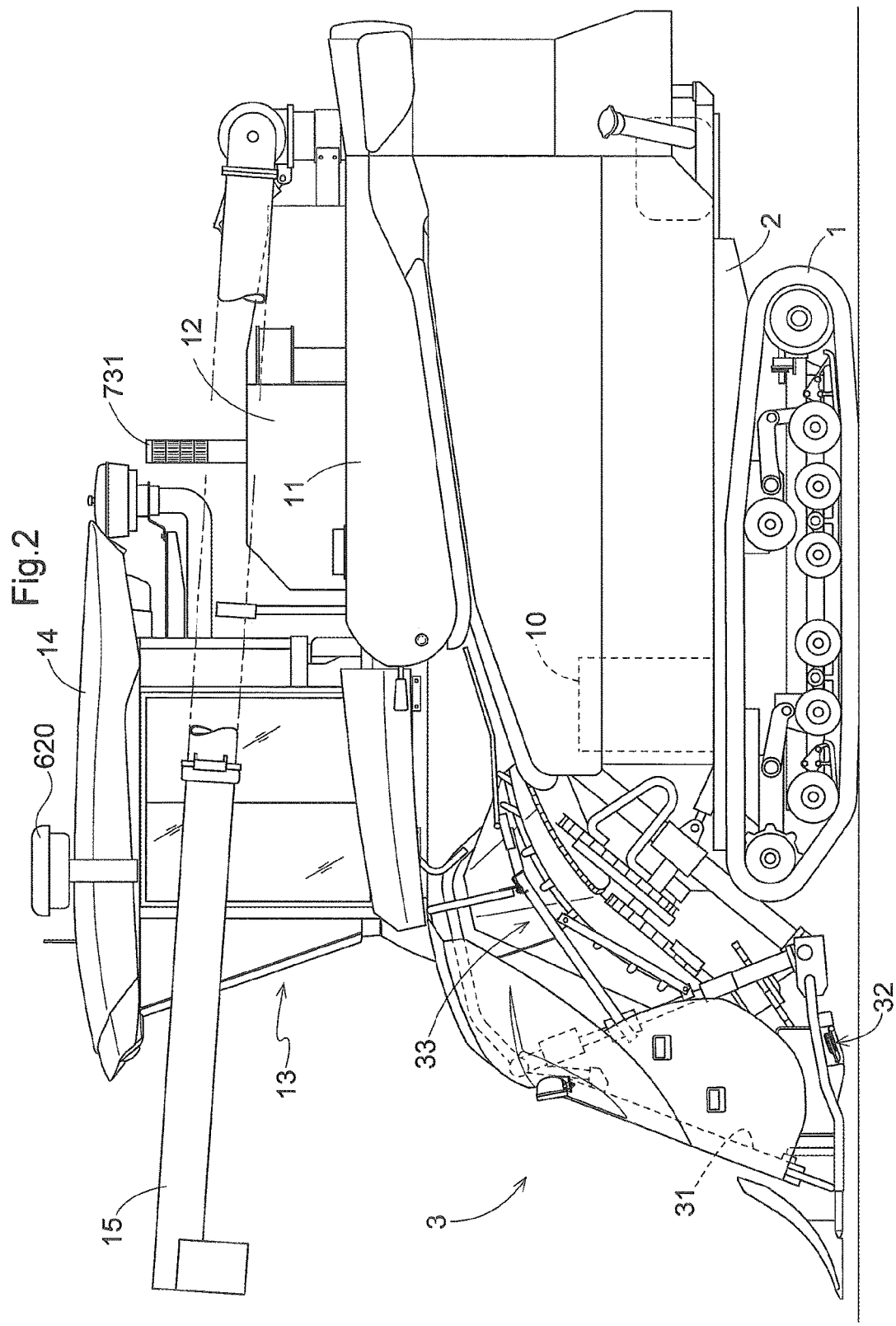
FIG. 2 is a side view of a combine, one example of the travel working machine, according to the present invention.
Figure 3:
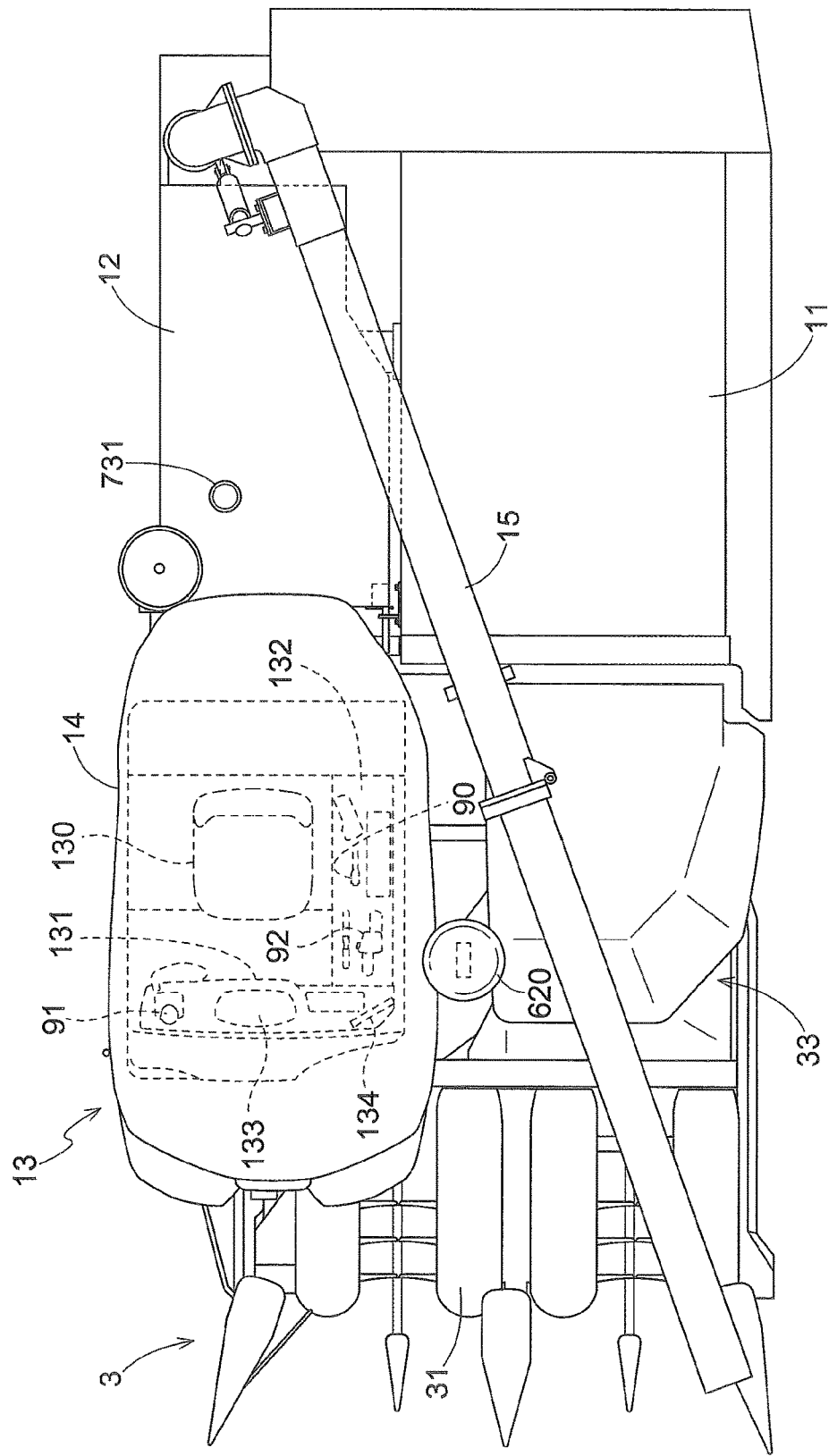
FIG. 3 is a plan view of the combine.

Next, a specific embodiment of the travel working machine according to the present invention will be described with reference to the drawings. FIG. 2 is a side view of a combine as an example of the travel working machine, and FIG. 3 is a plan view thereof. This combine is a culm-head feeding combine, and includes a crawler-type travel apparatus 1, and a machine body frame 2 supported by the travel apparatus 1. The front portion of the machine body frame 2 has a vertically movable harvesting section 3 that cuts standing grain culms. In the rear portion of the machine body frame 2, a threshing apparatus 11 for threshing cut grain culms and a grain tank 12 for storing grain are arranged side by side in the right-left direction. A cabin 13 in which a driver rides is provided in front of the grain tank 12, in the front portion of the machine body frame 2. The cabin 13 includes a ceiling panel 14. An engine 10 is arranged below the cabin 13. The grain tank 12 includes an unloader 15 for unloading grain in the grain tank 12.

The harvesting section 3 can swing up and down about a swing axis that is oriented horizontally in the right-left orientation. The harvesting section 3 includes a raising apparatus 31 for raising standing grain culms, a cutting apparatus 32 for cutting raised grain culms, and a conveying apparatus 33 for conveying cut grain culms to the threshing apparatus 11.

Figure 4:
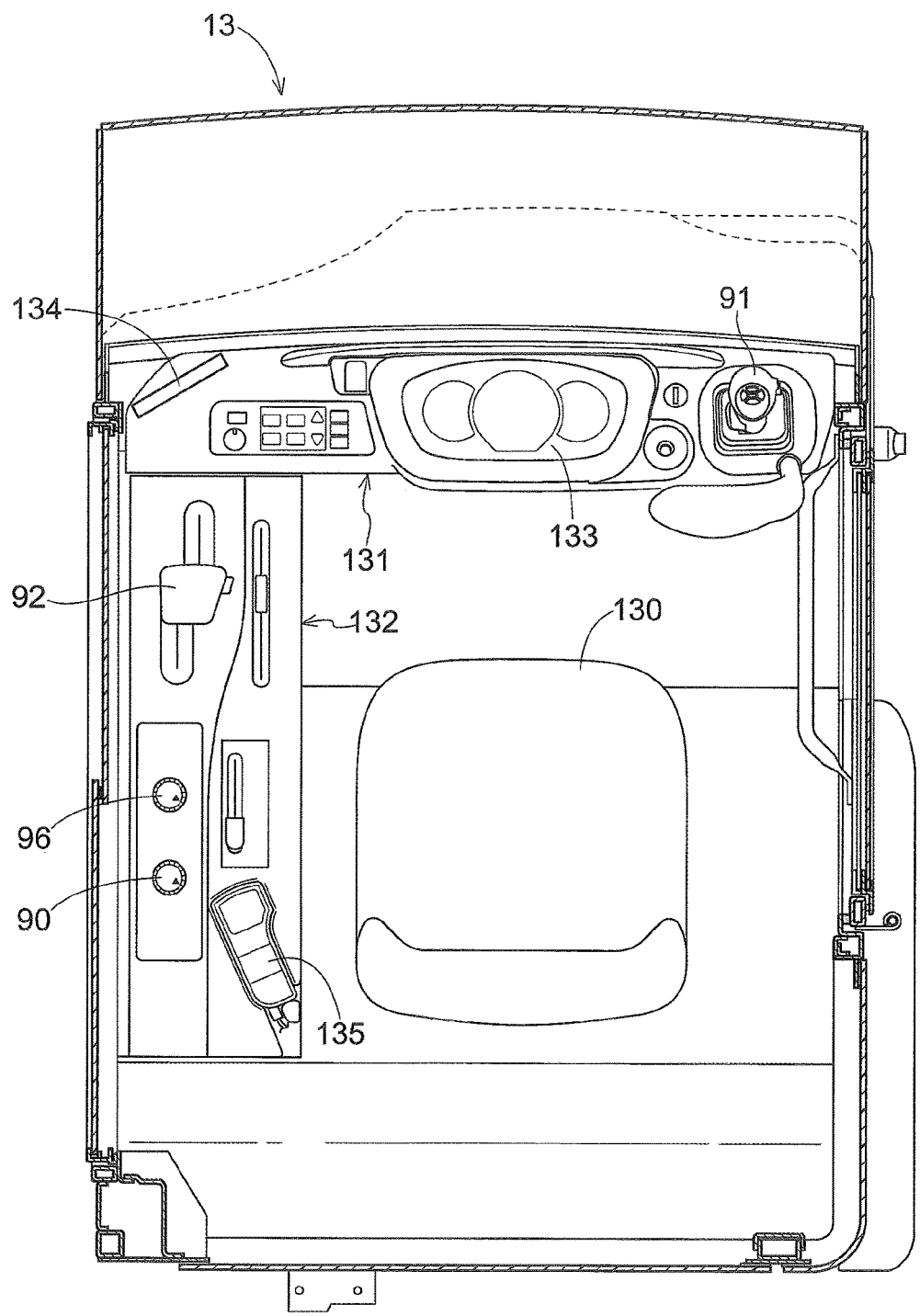
FIG. 4 is a plan view in section showing the inside of a cabin of the combine.

As shown in FIGS. 3 and 4, the cabin 13 includes a driver's seat 130. A front panel 131 is provided in front of the driver's seat 130, and a side panel 132 is provided on the left side of the driver's seat 130. On the front panel 131, for example, tools such as a manipulation lever (steering lever) 91 and a meter panel 133 for displaying various types of information are arranged. The meter panel 133 displays a meter screen indicating a working speed, engine rotation, a fuel level and the like. Furthermore, a monitor 134 such as a liquid crystal panel for graphically displaying specific information is arranged e.g. at an upper left portion inside the cabin 13. The monitor 134 displays a selection screen of a target travel route used for automatic working travel and the like. On the side panel 132, for example, a main speed change lever 92 and other tools are arranged. On the side panel 132, a remote controller 135 for the unloader is arranged.

This combine can implement not only manual travel based on operations made by the driver on the manipulation lever 91 or the main speed change lever 92, but also automatic travel along a set target route. As a tool related to automatic travel, as shown in FIG. 4, an autopilot ON/OFF switch 90 for giving a command to perform or stop automatic travel is arranged on the side panel 132. The autopilot ON/OFF switch 90, as well as other switches, may be replaced with software switches displayed on the monitor 134, or may be provided in both hardware and software forms.

As shown in FIGS. 2 and 3, an own vehicle position detecting box 620 attached to a bracket extending upward from a side end of the ceiling panel 14 is arranged above the cabin 13. An antenna, an arithmetic unit and the like used for detecting the own vehicle position are built into the own vehicle position detecting box 620. In this embodiment, the own vehicle position is detected using satellite navigation and inertial navigation.

Figure 5:
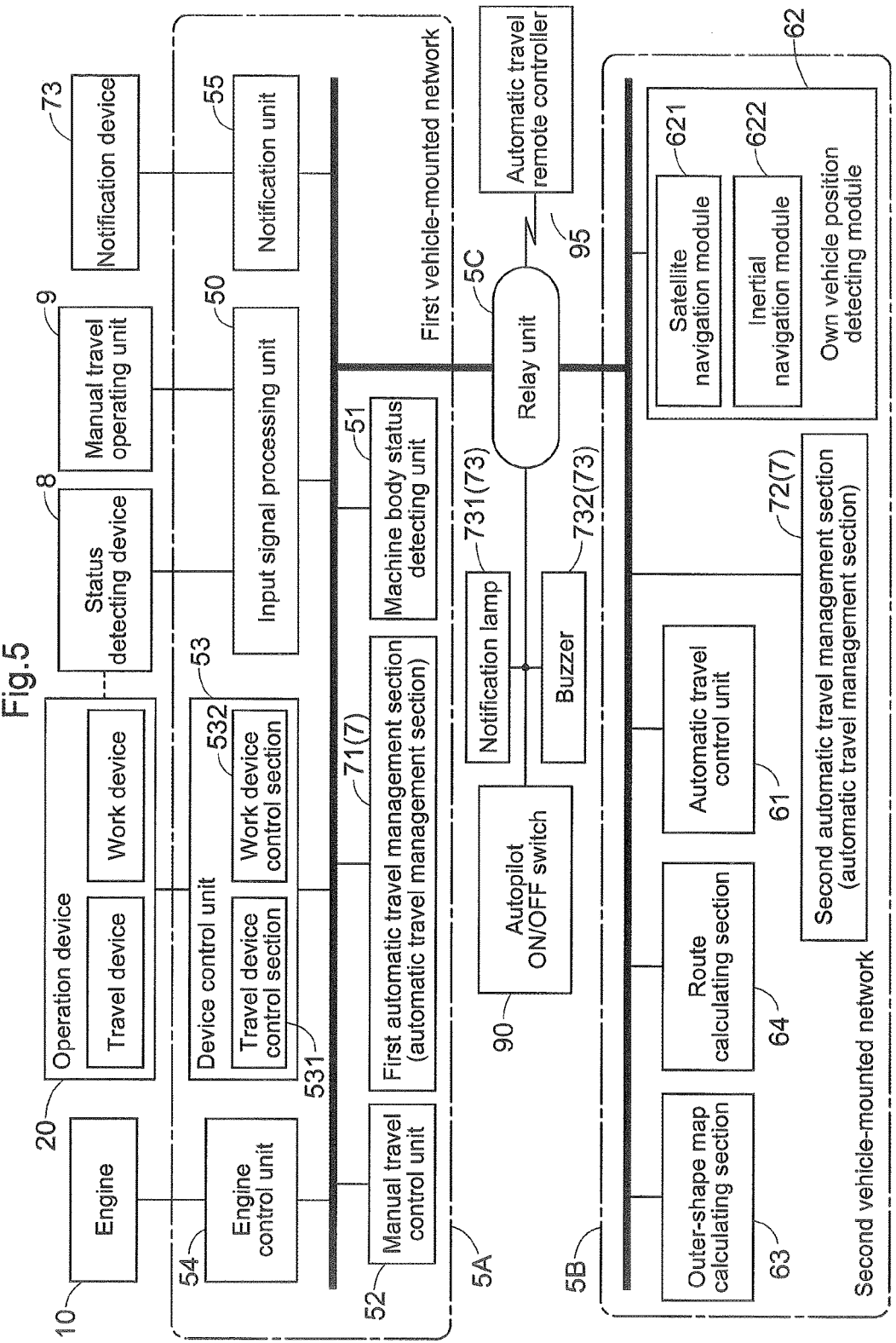
FIG. 5 is a functional block diagram illustrating a control system of the combine.

FIG. 5 shows a control system constructed in this combine. The control system uses the basic principle described with reference to FIG. 1, and includes a first vehicle-mounted network 5A and a second vehicle-mounted network 5B. The first vehicle-mounted network 5A and the second vehicle-mounted network 5B are bridged via a relay unit 5C. In the first vehicle-mounted network 5A, functional elements for performing basic operation control of the combine, for example, an input signal processing unit 50, a machine body status detecting unit 51, a manual travel control unit 52, a device control unit 53, an engine control unit 54 and a notification unit 55 are constructed. In the second vehicle-mounted network 5B, functional elements mainly related to automatic travel, for example, an automatic travel control unit 61, an own vehicle position detecting module 62, an outer-shape map calculating section 63 and a route calculating section 64 are constructed. Furthermore, in this embodiment, a first automatic travel management section 71 is constructed in the first vehicle-mounted network 5A as a constituent element of the automatic travel management section 7 for managing a relationship between manual travel control by the manual travel control unit 52 and automatic travel control by the automatic travel control unit 61; and a second automatic travel management section 72 is constructed in the second vehicle-mounted network 5B as another constituent element of the automatic travel management section 7.

The device control unit 53 includes a travel device control section 531 that drives various operation devices for traveling (travel devices) by giving them a control signal, and a work device control section 532 that drives various operation devices for working (work devices) by giving them a control signal. The travel devices and the work devices in this example are collectively referred to as an operation device 20. The engine control unit 54 gives a control signal to the engine 10 for starting and stopping the engine 10, and for adjusting the rotational speed thereof, for example. The manual travel operating unit 9 shown in FIG. 5 is a collective term for tools that are manually operated in working travel of the combine, and includes the manipulation lever 91, the main speed change lever 92 and the like. Essentially, this combine employs a by-wire method, and an operation made to the manual travel operating unit 9 is inputted as an operation signal to the input signal processing unit 50. As described above, the status detecting device 8 is a collective term for various sensors and switches provided in the combine. A detection signal from the status detecting device 8 for detecting the status of operation devices including various travel devices and work devices is also essentially inputted to the input signal processing unit 50.

The machine body status detecting unit 51 can detect various statuses of the combine based on detection signals from the status detecting device 8, and outputs machine body status information indicating such statuses of the combine. The machine body status information contains the status of the manipulation lever 91 or the main speed change lever 92, the status of the harvesting section 3, the grain accumulation status of the grain tank 12, the status of a vehicle speed sensor, the status of an emergency stop switch, a difference (the degree of a difference) between a target value and an actual value of various operation devices, or the like.

The notification unit 55 transmits a notification signal to a notification device 73, thereby notifying it of various types of information that is to be given to a driver and surrounding people. The notification device 73 includes not only the above-described monitor 134 but also various lamps inside or outside the machine body (e.g., a notification lamp 731 shown in FIGS. 2 and 3), a buzzer 732 and the like.

The manual travel control unit 52 performs arithmetic processing or determination processing, using a signal input through the input signal processing unit 50 or machine body status information from the machine body status detecting unit 51, thereby generating data for controlling an operation of the operation device 20 based on a manual operation. The generated data is transmitted to the device control unit 53, and is outputted from the device control unit 53 to the operation device 20 as a control signal. Accordingly, an operation of the operation device 20 corresponding to the manual operation is realized. For example, driving for changing the direction of the travel apparatus 1 is performed based on a direction change output signal, and the machine body traveling direction is changed.

The own vehicle position detecting module 62 includes a satellite navigation module 621 for detecting a bearing such as latitude and longitude using a GNSS (Global Navigation Satellite System, which may be a GPS (Global Positioning System), and has a configuration similar to that of an orientation measurement unit used in car navigation systems and the like. The own vehicle position detecting module 62 in this embodiment includes an inertial navigation module 622 incorporating a gyroscope acceleration sensor and a magnetic bearing sensor for detecting a momentary movement (direction vector, etc.) of the work vehicle and an orientation, for assisting the satellite navigation module 621.

The outer-shape map calculating section 63 calculates the outer-shape map of cultivated land in which automatic working travel is to be performed. Typically, circulating working while traveling through manual travel is performed along an outer perimeter of a piece of cultivated land in which barley or rice is grown, and an outer-shape map of a work-unfinished region in which automatic working travel is to be performed is calculated from own vehicle position data (own vehicle position information) acquired at that time by the own vehicle position detecting module 62. When the outer-shape map is calculated, the route calculating section 64 calculates a target travel route along which working travel is to be performed in a work-unfinished region, based on the outer-shape map.

The automatic travel control unit 61 implements automatic travel, based on automatic travel information necessary for automatic travel. The automatic travel information contains deviation between the own vehicle position based on the own vehicle position data and the target travel route, deviation between a travel direction of the own vehicle and a direction obtained by extending the target travel route, a vehicle speed set in advance, an operation of the working machine that needs to be performed during travel along the target travel route, machine body status information from the status detecting device 8, and the like. The automatic travel control unit 61 gives the necessary control data to the device control unit 53 based on the automatic travel information, thereby controlling the travel devices and the work devices mounted in the combine.

The second automatic travel management section 72 that is a constituent element of the automatic travel management section 7 determines forbiddance of automatic travel and permission of the automatic travel by the automatic travel control unit 61 in cooperation with the first automatic travel management section 71 as described above with reference to FIG. 1; and based on the machine body status information, the second automatic travel management section 72 outputs a control command in automatic travel forbiddance for deciding control of the machine body to be performed after a command to forbid the automatic travel has been issued.

In this embodiment, the relay unit 5C performs data exchange between the first vehicle-mounted network 5A and the second vehicle-mounted network 5B; and the relay unit 5C itself includes an input/output interface for an external device and a data processing section. Furthermore, the relay unit 5C has a filtering function of selecting a transfer destination of data between the first vehicle-mounted network 5A and the second vehicle-mounted network 5B. Still further, the relay unit 5C has connected thereto the notification lamp 731 and the buzzer 732, each functioning as the notification device 73, and the autopilot ON/OFF switch; and also the relay unit 5C has an automatic travel remote controller 95 wirelessly connected thereto.

Various types of data can be transmitted via the relay unit 5C from the first vehicle-mounted network 5A to the second vehicle-mounted network 5B, or from the second vehicle-mounted network 5B to the first vehicle-mounted network 5A, but unrestricted data exchange can be restricted by the filtering function of the relay unit 5C. Moreover, the first vehicle-mounted network 5A and the second vehicle-mounted network 5B can be disconnected from each other taking the relay unit 5C as a separation point. At that time, the first vehicle-mounted network 5A and the second vehicle-mounted network 5B can independently function, and thus a combine including only the first vehicle-mounted network 5A can be driven through manual control, whereas the remaining second vehicle-mounted network 5B can independently perform simulation and the like of driving through automatic control.

As shown in FIGS. 2 and 3, the notification lamp 731 is a cylindrical lamp provided upright on the upper face of the grain tank 12, and may turn on during automatic travel, thereby notifying surrounding people of that the combine is in automatic travel. In a similar manner, the buzzer 732 can notify surrounding people of that the combine is in automatic travel. The autopilot ON/OFF switch 90 is a switch for implementing automatic travel, and automatic travel is not performed unless at least the autopilot ON/OFF switch 90 is ON. When the combine is in automatic travel, the bare minimum commands have to be made from outside the combine to the combine, and thus the automatic travel remote controller 95 is provided. The automatic travel remote controller 95 is operable to provide, for example, an emergency stop button, an engine start button and an automatic drive button; and from outside the combine to the control system of the combine, the automatic travel remote controller 95 is operable to provide commands to stop the combine in an emergency, to start the engine, and to perform automatic driving.

Figure 6:
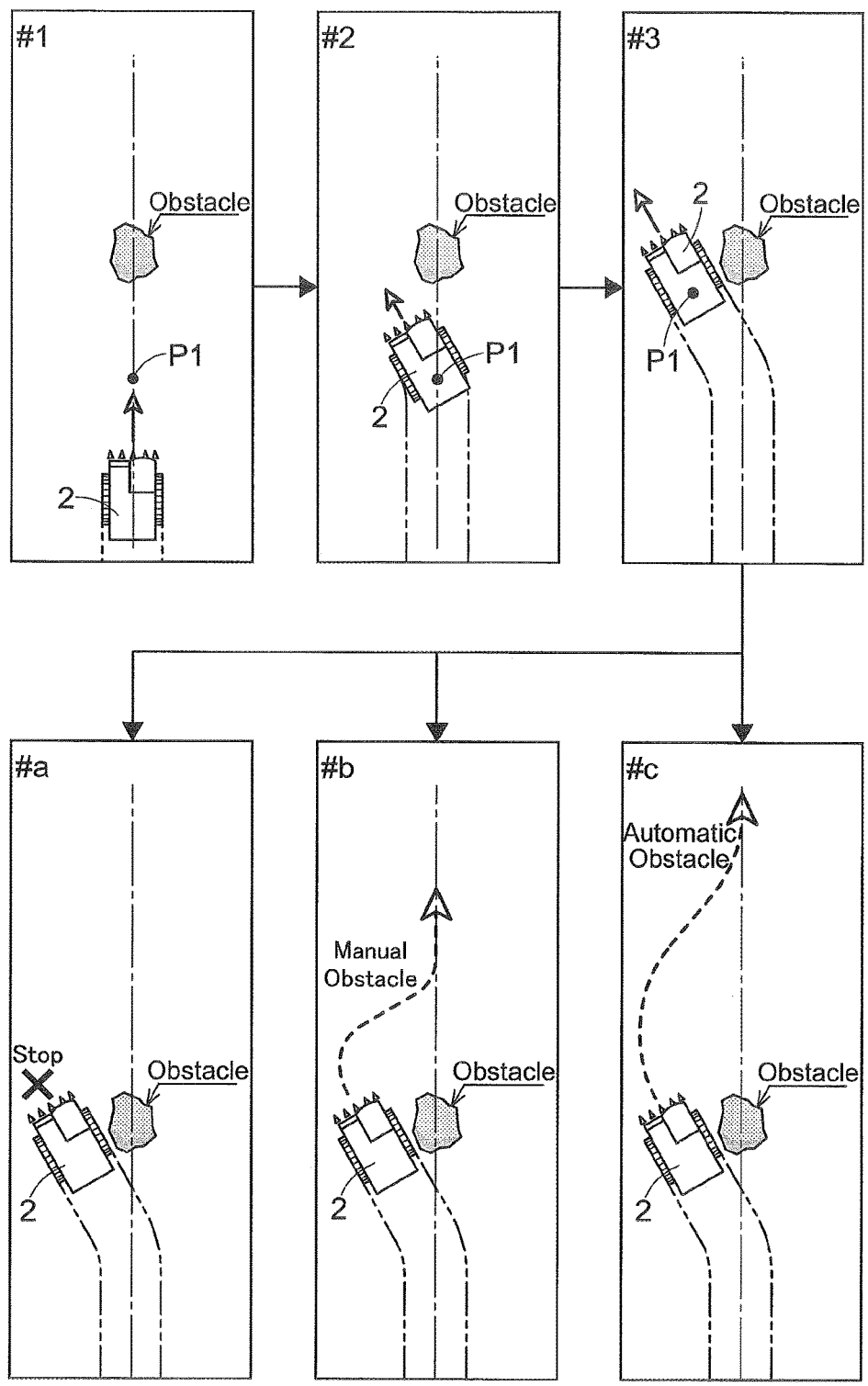
FIG. 6 is an explanatory view illustrating machine body control in a plurality of modes that can be implemented after changing from automatic travel to manual travel.

In this embodiment, if an operator operates the manipulation lever 91 during automatic travel, a command to forbid automatic travel is issued and the automatic travel is stopped. However, the machine body continues to travel. This event occurs when an obstacle in the target travel route is to be avoided. After changing from automatic travel to manual travel, a plurality of modes can be selected as control of the machine body. Hereinafter, the plurality of modes will be described with reference to FIG. 6. The series of control is performed by the automatic travel management section 7.

(1) When a driver finds an obstacle in the target travel route (#1), the driver operates the manipulation lever 91 at an avoidance direction change point: P1, thereby turning the machine body to the left (#2). At this time, the travel control changes from automatic travel to manual travel.

(2) With this turning to the left, the machine body is in an orientation for avoiding the obstacle, and there is no obstacle on the front side in the travel direction (#3). The travel control at this point: P2 can be selected in advance from the following three options (a), (b) and (c).

(a) The machine body is stopped. Since it is a change from automatic travel to manual travel in order to avoid an emergency, the machine body is automatically stopped once (a travel stop command is outputted), and the driver is asked to determine the next travel control (automatic travel or manual travel) (#a).

(b) The manual travel is tentatively continued. The driver manually implements travel for passing by the obstacle and travel for returning to the target travel route (#b).

(c) When the driver stops a manual operation, for example, when an operation made to the manipulation lever 91 is stopped or when the manipulation lever 91 is returned to the neutral position, the manual travel is changed to automatic travel. Accordingly, the automatic travel control unit 61 generates a steering command in order to align the own vehicle position acquired by the own vehicle position detecting module 62 to the target travel route, and drives the travel apparatus 1 through the device control unit 53 (#c).

Note that it is possible to make a decision through some operation performed by the driver, on the manual travel operating unit 9, when the machine body is oriented to avoid an obstacle, instead of setting these three options for travel control in advance.

Other Embodiments (1) In the foregoing embodiment, the function of the automatic travel management section 7 is divided into the first automatic travel management section 71 and the second automatic travel management section 72, wherein the first automatic travel management section 71 is constructed in the first vehicle-mounted network 5A including the manual travel control unit 52, and the second automatic travel management section 72 is constructed in the second vehicle-mounted network 5B including the automatic travel control unit 61. However, the function of the automatic travel management section 7 does not absolutely have to be divided. Furthermore, the first automatic travel management section 71 may be incorporated in the manual travel control unit 52, and the second automatic travel management section 72 may be incorporated in the automatic travel control unit 61.

(2) In the foregoing embodiment, the control system of the combine includes the first vehicle-mounted network 5A and the second vehicle-mounted network 5B bridged via the relay unit 5C, but it may include three or more vehicle-mounted networks, or may be constituted by a single vehicle-mounted network. If the first vehicle-mounted network 5A is a vehicle-mounted network for a conventional manual travel vehicle, it is advantageous to add an automatic travel function to the conventional manual travel vehicle because the vehicle-mounted network of the conventional manual travel vehicle can be used substantially as it is, by constructing an automatic travel-related functional block in the second vehicle-mounted network 5B bridged via the relay unit 5C.

INDUSTRIAL APPLICABILITY

The present invention can be applied to work vehicles such as culm-head feeding combines, ordinary combines (whole-culm feeding combines), rice transplanting machines and tractors.

DESCRIPTION OF REFERENCE SIGNS

5A First vehicle-mounted network
5B Second vehicle-mounted network
5C Relay unit
50 Input signal processing unit
51 Machine body status detecting unit
52 Manual travel control unit
53 Device control unit
531 Travel device control section
532 Work device control section
54 Engine control unit
55 Notification unit
61 Automatic travel control unit
62 Own vehicle position detecting module
620 Own vehicle position detecting box
621 Satellite navigation module
622 Inertial navigation module
63 Outer-shape map calculating section
64 Route calculating section
7 Automatic travel management section
71 First automatic travel management section
72 Second automatic travel management section
9 Manual travel operating unit
90 Autopilot ON/OFF switch

What is claimed is:

1. A travel working machine comprising:
an automatic travel control unit configured to implement automatic travel based on automatic travel information necessary for automatic travel;
a manual travel control unit configured to implement manual travel based on an operation signal from a manual travel operating unit;
a machine body status detecting unit configured to output machine body status information indicating a machine body status based on the operation signal and a detection signal received from a status detecting device; and
an automatic travel management section configured to determine forbiddance of automatic travel by the automatic travel control unit and permission of the automatic travel based on the machine body status information, and output a control command selected from a plurality of control commands in automatic travel forbiddance, for deciding control of the machine body after a command to forbid the automatic travel has been issued, based on the machine body status information.

2. The travel working machine according to claim 1, further comprising:
a first vehicle-mounted network configured to transmit data between the manual travel control unit and the machine body status detecting unit, receive data from the manual travel control unit and the machine body status detecting unit, and transmit data therefrom to the manual travel control unit and the machine body status detecting unit;
a second vehicle-mounted network configured to receive data from the automatic travel control unit, and transmit data therefrom to the automatic travel control unit; and
a relay unit configured to function as a bridge between the first vehicle-mounted network and the second vehicle-mounted network,
wherein the relay unit has a filtering function of selecting data that is to be transmitted between the first vehicle-mounted network and the second vehicle-mounted network.

3. The travel working machine according to claim 2,
wherein the automatic travel management section includes a first automatic travel management section that is linked to the manual travel control unit in the first vehicle-mounted network, and a second automatic travel management section that is linked to the automatic travel control unit in the second vehicle-mounted network, and
the machine body status information is transmitted from the machine body status detecting unit via the relay unit to the second automatic travel management section.

4. The travel working machine according to claim 2, wherein an own vehicle position detecting module for acquiring own vehicle position information is connected to the second vehicle-mounted network.

5. The travel working machine according to claim 1, wherein the machine body status information contains information indicating a current status of the machine body.

6. The travel working machine according to claim 1, wherein the machine body status information contains information indicating a difference between a target value and an actual value.

7. The travel working machine according to claim 1, wherein the automatic travel management section forbids automatic travel by the automatic travel control unit in a case where an anomaly in the automatic travel control unit is detected.

8. The travel working machine according to claim 1, wherein, in a case where automatic travel by the automatic travel control unit is forbidden, an engine stop command is outputted.

9. The travel working machine according to claim 1, wherein the plurality of control commands includes at least a travel stop command of the machine body, and a travel continuation command after the command to forbid the automatic travel.

10. The travel working machine according to claim 1, wherein, in a case where automatic travel by the automatic travel control unit is forbidden, manual travel by the manual travel control unit is permitted.

11. The travel working machine according to claim 1, wherein the detection signal used for outputting the machine body status information can be selected.

12. The travel working machine according to claim 9, wherein, in a case where automatic travel by the automatic travel control unit is forbidden, the travel stop command is outputted.

13. A travel working machine comprising:
an automatic travel control unit configured to implement automatic travel based on automatic travel information necessary for automatic travel;
a manual travel control unit configured to implement manual travel based on an operation signal from a manual travel operating unit;
a machine body status detecting unit configured to output machine body status information indicating a machine body status based on the operation signal and a detection signal received from a status detecting device; and
an automatic travel management section configured to determine forbiddance of automatic travel by the automatic travel control unit and permission of the automatic travel based on the machine body status information, and output a control command selected from a plurality of control commands in automatic travel forbiddance, for deciding control of the machine body after a command to forbid the automatic travel has been issued, based on the machine body status information;
wherein the operation signal comprises a direction change to avoid an obstacle, and the control of the machine body after the direction change is decided by the command to forbid the automatic travel.

14. A travel working machine comprising:
an automatic travel control unit configured to implement automatic travel based on automatic travel information necessary for automatic travel;
a manual travel control unit configured to implement manual travel based on an operation signal from a manual travel operating unit;
a machine body status detecting unit configured to output machine body status information indicating a machine body status based on the operation signal and a detection signal received from a status detecting device; and
an automatic travel management section configured to determine forbiddance of automatic travel by the automatic travel control unit and permission of the automatic travel based on the machine body status information, and output a control command in automatic travel forbiddance, for deciding control of the machine body after a command to forbid the automatic travel has been issued, based on the machine body status information;
wherein the manual travel control unit and the machine body status detecting unit are connected to a first vehicle-mounted network, the automatic travel control unit is connected to a second vehicle-mounted network, the travel working machine further includes a relay unit configured to function as a bridge between the first vehicle-mounted network and the second vehicle-mounted network, and the relay unit has a filtering function of selecting data that is to be transmitted between the first vehicle-mounted network and the second vehicle-mounted network.

15. The travel working machine according to claim 14, wherein the automatic travel management section includes a first automatic travel management section that is linked to the manual travel control unit in the first vehicle-mounted network, and a second automatic travel management section that is linked to the automatic travel control unit in the second vehicle-mounted network, and
the machine body status information is transmitted from the machine body status detecting unit via the relay unit to the second automatic travel management section.

16. The travel working machine according to claim 15, wherein an own vehicle position detecting module for acquiring own vehicle position information is connected to the second vehicle-mounted network.

* * * * *